United States Patent
Blair et al.

(10) Patent No.: US 12,326,742 B2
(45) Date of Patent: Jun. 10, 2025

(54) VALVE AND ACTUATOR ASSEMBLY FOR A FLUID SYSTEM IN A VEHICLE SEAT ASSEMBLY

(71) Applicant: Lear Corporation, Southfield, MI (US)

(72) Inventors: Samuel Blair, Troy, MI (US); Joshua Hallock, Warren, MI (US); David Abdella, Royal Oak, MI (US)

(73) Assignee: Lear Corporation, Southfield, MI (US)

( * ) Notice: Subject to any disclaimer, the term of this patent is extended or adjusted under 35 U.S.C. 154(b) by 171 days.

(21) Appl. No.: 18/087,223

(22) Filed: Dec. 22, 2022

(65) Prior Publication Data
US 2024/0210971 A1 Jun. 27, 2024

(51) Int. Cl.
*G05D 16/20* (2006.01)
*B60N 2/90* (2018.01)

(52) U.S. Cl.
CPC .......... *G05D 16/204* (2013.01); *B60N 2/914* (2018.02); *G05D 16/2024* (2019.01)

(58) Field of Classification Search
CPC .. G05D 16/204; G05D 16/2024; B60N 2/914; F16K 11/14; Y10T 137/87708
See application file for complete search history.

(56) References Cited

U.S. PATENT DOCUMENTS

| | | |
|---|---|---|
| RE30,491 E | 1/1981 | Gomez |
| 4,865,383 A | 9/1989 | Sbaragli et al. |
| 5,092,316 A | 3/1992 | Taylor et al. |
| 5,294,085 A | 3/1994 | Lloyd et al. |
| 5,551,755 A | 9/1996 | Lindberg |
| 5,658,046 A | 8/1997 | Rus |
| 5,658,050 A | 8/1997 | Lorbiecki |
| 5,711,575 A | 1/1998 | Hand et al. |
| 5,811,186 A | 9/1998 | Martin et al. |
| 5,971,478 A | 10/1999 | Hurite |
| 5,975,629 A * | 11/1999 | Lorbiecki .............. B60N 2/665 297/284.6 |
| 6,129,419 A | 10/2000 | Neale |

(Continued)

FOREIGN PATENT DOCUMENTS

| | | |
|---|---|---|
| CN | 109689428 A | 4/2019 |
| CN | 213322780 U | 6/2021 |

(Continued)

OTHER PUBLICATIONS

Barker, "BMW's Heated Seats as a Service Model Has Drivers Seeking Hacks", https://www.wired.com/story/bmw-heated-seats-as-a-service-model-has-drivers-seeking-hacks, Jul. 24, 2022, 13 pages.

(Continued)

*Primary Examiner* — Jessica Cahill
(74) *Attorney, Agent, or Firm* — Carlson, Gaskey & Olds, P.C.

(57) ABSTRACT

A system is provided with a first valve having a first valve element, and a second valve having a second valve element, with the second valve positioned adjacent to the first valve. A first actuator is provided with an actuator member movable between a first actuator position and a second actuator position, and the actuator member is coupled to each of the first valve element and the second valve element for movement therewith. A method of controlling the system is also provided.

19 Claims, 5 Drawing Sheets

(56) References Cited

U.S. PATENT DOCUMENTS

| | | | |
|---|---|---|---|
| 6,273,810 B1* | 8/2001 | Rhodes, Jr. | A47C 7/467 |
| | | | 297/452.47 |
| 6,869,140 B2 | 3/2005 | White et al. | |
| 6,893,086 B2 | 5/2005 | Bajic et al. | |
| 7,040,710 B2 | 5/2006 | White et al. | |
| 7,052,091 B2 | 5/2006 | Bajic et al. | |
| 7,197,801 B2 | 4/2007 | Bajic et al. | |
| 7,229,129 B2 | 6/2007 | White et al. | |
| 7,434,282 B2 | 10/2008 | Fraser et al. | |
| 7,478,869 B2 | 1/2009 | Lazanja et al. | |
| 7,637,573 B2 | 12/2009 | Bajic et al. | |
| 7,735,932 B2 | 6/2010 | Lazanja et al. | |
| 7,775,602 B2 | 8/2010 | Lazanja et al. | |
| 7,874,616 B2 | 1/2011 | D'Agostini | |
| 7,892,991 B2 | 2/2011 | Yamanaka et al. | |
| 7,946,649 B2 | 5/2011 | Galbreath et al. | |
| 7,971,931 B2 | 7/2011 | Lazanja et al. | |
| 8,038,222 B2 | 10/2011 | Lein et al. | |
| 8,162,391 B2 | 4/2012 | Lazanja et al. | |
| 8,162,398 B2 | 4/2012 | Colja et al. | |
| 8,360,517 B2 | 1/2013 | Lazanja et al. | |
| 8,662,583 B2 | 3/2014 | Guadagno | |
| 8,777,320 B2 | 7/2014 | Stoll et al. | |
| 8,814,267 B2 | 8/2014 | Welch, Sr. et al. | |
| 9,080,581 B2 | 7/2015 | Bocsanyi et al. | |
| 9,266,455 B2 | 2/2016 | Uramichi et al. | |
| 9,278,633 B2 | 3/2016 | Brncick et al. | |
| 9,440,567 B2 | 9/2016 | Lazanja et al. | |
| 9,561,744 B2 | 2/2017 | Galbreath et al. | |
| 9,615,670 B2 | 4/2017 | Takaoka | |
| 9,751,442 B2 | 9/2017 | Smith | |
| 9,862,244 B2 | 1/2018 | Kim et al. | |
| 9,938,649 B2 | 4/2018 | Taninaka et al. | |
| 9,945,490 B2 | 4/2018 | Dankbaar et al. | |
| 9,970,140 B2 | 5/2018 | Taninaka et al. | |
| 9,970,564 B2 | 5/2018 | Dankbaar et al. | |
| 10,065,543 B2 | 9/2018 | Persson et al. | |
| 10,107,410 B2 | 10/2018 | Dankbaar et al. | |
| 10,160,356 B2 | 12/2018 | Lofy et al. | |
| 10,207,619 B2 | 2/2019 | Dankbaar et al. | |
| 10,214,129 B2 | 2/2019 | Jaranson et al. | |
| 10,378,677 B2* | 8/2019 | Kuszneruk | B60N 2/665 |
| 10,384,574 B2 | 8/2019 | Fang | |
| 10,414,303 B2 | 9/2019 | Fujikake et al. | |
| 10,625,643 B2 | 4/2020 | Iacovone et al. | |
| 10,676,000 B2 | 6/2020 | Galbreath et al. | |
| 10,696,202 B2 | 6/2020 | Sedenka | |
| 10,710,480 B2 | 7/2020 | Iacovone et al. | |
| 10,752,145 B2 | 8/2020 | Steinberger et al. | |
| 10,773,615 B2 | 9/2020 | McElroy et al. | |
| 10,786,162 B2 | 9/2020 | Benson et al. | |
| 10,793,041 B2 | 10/2020 | Steinberger et al. | |
| 10,856,664 B2 | 12/2020 | Bhatia et al. | |
| 10,899,262 B2 | 1/2021 | Wheeler | |
| 10,948,098 B2* | 3/2021 | Pfahler | F16K 31/002 |
| 11,014,478 B2 | 5/2021 | Benthaus et al. | |
| 11,065,991 B2 | 7/2021 | Iacovone et al. | |
| 11,091,072 B2 | 8/2021 | Greenwood et al. | |
| 11,247,529 B2 | 2/2022 | Zhou et al. | |
| 11,865,950 B2* | 1/2024 | Katheder | B60N 2/02 |
| 2002/0096931 A1 | 7/2002 | White et al. | |
| 2003/0038517 A1 | 2/2003 | Moran et al. | |
| 2003/0075960 A1 | 4/2003 | Wilkerson et al. | |
| 2004/0004376 A1 | 1/2004 | Cabebe | |
| 2005/0066423 A1 | 3/2005 | Hogan | |
| 2006/0208540 A1 | 9/2006 | Lofy et al. | |
| 2006/0217644 A1 | 9/2006 | Ozaki et al. | |
| 2007/0035165 A1 | 2/2007 | Zahel | |
| 2010/0207443 A1 | 8/2010 | Brncick | |
| 2011/0227388 A1* | 9/2011 | Bocsanyi | B60N 2/914 |
| | | | 297/452.41 |
| 2012/0299360 A1 | 11/2012 | Welch, Sr. et al. | |
| 2013/0097777 A1 | 4/2013 | Marquette et al. | |
| 2013/0187419 A1 | 7/2013 | Worlitz et al. | |
| 2015/0069811 A1 | 3/2015 | Sachs et al. | |
| 2015/0165940 A1 | 6/2015 | Schnell et al. | |
| 2015/0173320 A1* | 6/2015 | Balkenhol | A01J 7/00 |
| | | | 137/862 |
| 2016/0200228 A1 | 7/2016 | Saren et al. | |
| 2017/0043681 A1 | 2/2017 | Seiller et al. | |
| 2017/0266070 A1* | 9/2017 | Bobey | A61G 7/05769 |
| 2017/0283071 A1 | 10/2017 | Velasco | |
| 2018/0008507 A1 | 1/2018 | Sarén et al. | |
| 2018/0009343 A1 | 1/2018 | Saren et al. | |
| 2018/0036198 A1 | 2/2018 | Mergl et al. | |
| 2018/0361892 A1 | 12/2018 | Iacovone et al. | |
| 2018/0361897 A1 | 12/2018 | Lem et al. | |
| 2019/0143856 A1 | 5/2019 | O'Hara et al. | |
| 2020/0080658 A1* | 3/2020 | Waddell | F01D 17/148 |
| 2020/0088314 A1* | 3/2020 | Samain | F16K 31/025 |
| 2020/0108752 A1 | 4/2020 | Morishita et al. | |
| 2020/0215765 A1 | 7/2020 | Murmann et al. | |
| 2021/0024155 A1 | 1/2021 | Primeaux et al. | |
| 2021/0115607 A1 | 4/2021 | Inoue et al. | |
| 2021/0339662 A1 | 11/2021 | Iacovone et al. | |
| 2021/0354401 A1 | 11/2021 | Kurematsu et al. | |
| 2022/0080868 A1 | 3/2022 | Kalmutzki et al. | |
| 2022/0236131 A1 | 7/2022 | Clemente et al. | |
| 2022/0274516 A1 | 9/2022 | Withey | |
| 2022/0314851 A1 | 10/2022 | Pereny et al. | |
| 2022/0314854 A1 | 10/2022 | Pereny et al. | |

FOREIGN PATENT DOCUMENTS

| | | |
|---|---|---|
| CN | 113459913 A | 10/2021 |
| CN | 112622722 B | 3/2023 |
| DE | 10056235 A1 | 5/2002 |
| DE | 10116696 C1 | 9/2002 |
| DE | 10353596 A1 | 6/2005 |
| DE | 102011122124 A1 | 7/2012 |
| DE | 102014001678 B3 | 7/2014 |
| DE | 102014201663 B4 | 8/2016 |
| DE | 112017004243 T5 | 5/2019 |
| DE | 102018101450 A1 | 7/2019 |
| DE | 102019206830 A1 | 11/2020 |
| DE | 102019219675 A1 | 6/2021 |
| DE | 102017221150 B4 | 7/2021 |
| DE | 202021103121 U1 | 6/2022 |
| DE | 102019214576 B4 | 5/2023 |
| EP | 2230126 A2 | 9/2010 |
| EP | 3037703 A1 | 6/2016 |
| EP | 2423040 B1 | 10/2017 |
| EP | 3281821 B1 | 4/2019 |
| FR | 2692477 A1 | 12/1993 |
| FR | 2771271 A1 | 5/1999 |
| FR | 3036336 B1 | 6/2017 |
| JP | 10000922 A2 | 1/1998 |
| JP | 2000004993 A | 1/2000 |
| JP | 2012115515 A | 6/2012 |
| JP | 2018149799 A | 9/2018 |
| JP | 2021074092 A | 5/2021 |
| KR | 20140005569 U | 10/2014 |
| KR | 101880763 B1 | 7/2018 |
| KR | 102228215 B1 | 3/2021 |
| WO | 2004026623 A1 | 4/2004 |
| WO | 2015039701 A1 | 3/2015 |
| WO | 2017025404 A1 | 2/2017 |
| WO | 2018039472 A1 | 3/2018 |
| WO | 2019079027 A1 | 4/2019 |
| WO | 2020257925 A1 | 12/2020 |
| WO | 2022051047 A1 | 3/2022 |
| WO | 2022069934 A1 | 4/2022 |

OTHER PUBLICATIONS https://www.tesplus.com/model-3-seat-massage-module.html, "Massage Module for Model 3/Y", 2022, 6 pages.

YouTube, "The Sterling Coilmaster Jr. TS Plastic Spiral Binding Machine", https://www.youtube.com/watch?v=8iariyFJRjY, Mar. 21, 2017, 2 pages.

International Search Report and Written Opinion for Application No. PCT/US23/25365, dated Sep. 19, 2023, 18 pages.

(56) References Cited

OTHER PUBLICATIONS

International Search Report and Written Opinion for Application No. PCT/US23/25473, dated Oct. 11, 2023, 11 pages.
International Search Report and Written Opinion for Application No. PCT/US2023/025395, dated Oct. 16, 2023, 20 pages.
Invitation to Pay Additional Fees for Application No. PCT/US2023/025395, dated Aug. 2, 2023, 3 pages.
Invitation to Pay Additional Fees for Application No. PCT/US23/25483, dated Aug. 14, 2023, 3 pages.
Invitation to Pay Additional Fees for Application No. PCT/US2023/025413, dated Aug. 2, 2023, 3 pages.

* cited by examiner

VALVE AND ACTUATOR ASSEMBLY FOR A FLUID SYSTEM IN A VEHICLE SEAT ASSEMBLY

TECHNICAL FIELD

Various embodiments relate to a valve and actuator assembly for use with fluid systems in a vehicle seat assembly.

DETAILED DESCRIPTION

Figure 1:
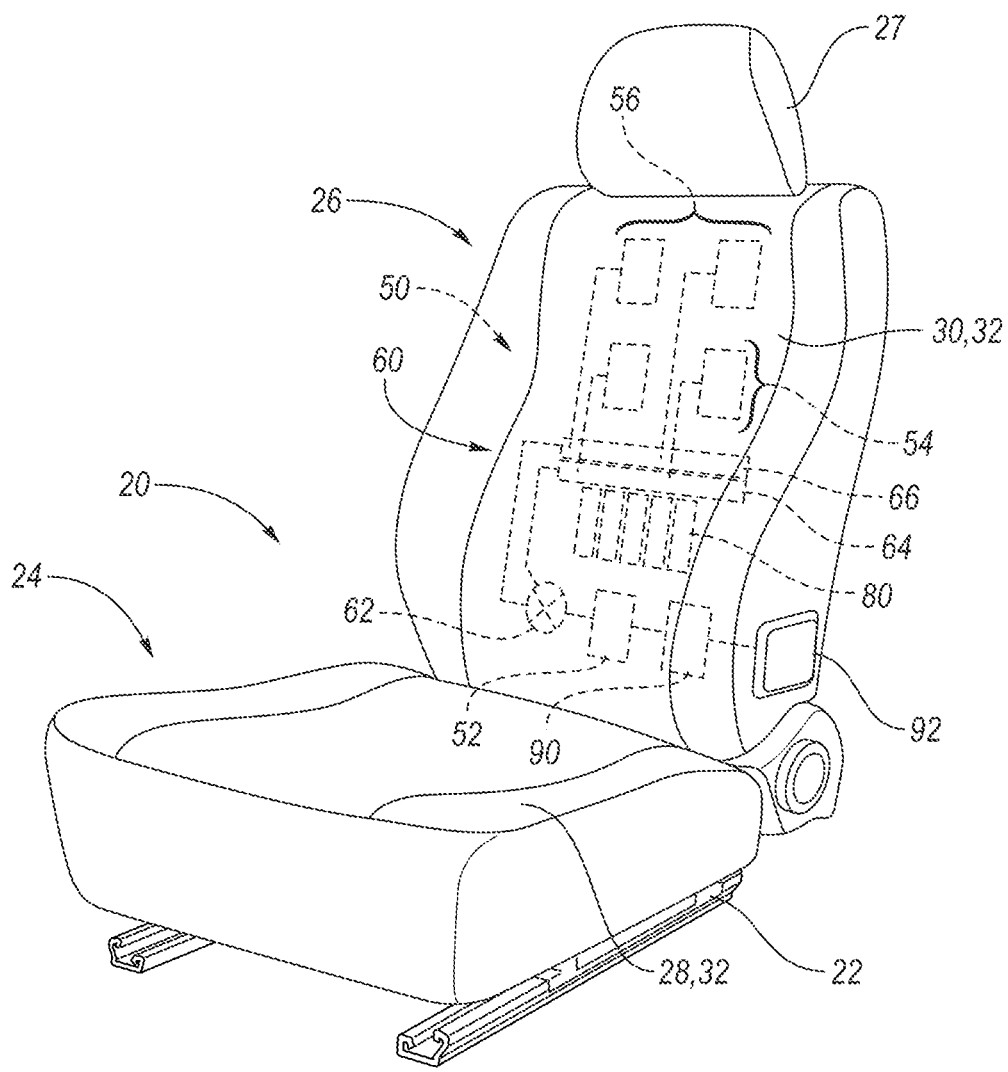
FIG. 1 illustrates a perspective schematic view of a seat assembly according to an embodiment.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments according to the disclosure.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Referring to FIG. 1, a seat assembly 20, such as a vehicle seat assembly 20 is illustrated. In other examples, the seat assembly 20 may be shaped and sized as a front row driver or passenger seat, a second, third, or other rear row seat, and may include bench-style seats as shown, bucket seats, or other seat styles. Furthermore, the seat assembly may be a non-stowable seat or a stowable seat that may be foldable and stowable in a cavity in the vehicle floor. Additionally, the seat assembly 20 may be configured for use with other non-vehicle applications.

The seat assembly 20 has a support structure 22 that may be provided by one or more support members. A support member may be provided by a frame and/or a substrate. The seat assembly has seat components, and these seat components include at least a seat bottom 24 and a seat back 26. The seat bottom 24 may be sized to receive a seated occupant to support a pelvis and thighs of the occupant. The seat back 26 may be sized to extend upright from the seat bottom 24 to support a back of the occupant. The seat assembly may additionally have a head restraint 27. The seat bottom 24 has a seat bottom cushion 28. The seat back 26 has a seat back cushion 30. The support structure 22 provides rigid structural support for the seat components, e.g. the seat bottom 24 and seat back 26, and the associated cushions 28, 30. One or more trim assemblies 32 are used to cover the seat bottom cushion 28 and/or the seat back cushion 30, and provide a seating surface for the seat assembly 20.

The seat assembly 20 has one or more fluid systems 50, such as an air system. Although only one fluid system 50 is shown, it is also contemplated that the seat assembly 20 may have two or more fluid systems 50. The fluid system 50 has a fluid transfer device 52 to provide pressurized fluid flow or air flow to one or more series of bladder assemblies 54, 56 in the seat assembly 20. Each series of bladder assemblies 54, 56 may be associated with a separate fluid sub-system. The fluid transfer device 52 may be a fan, air pump, compressor, blower, pump, or the like to provide flow of a fluid. The seat assembly 20 is shown with two series of bladder assemblies 54, 56; however the seat assembly 20 may have more than two series of bladder assemblies, and may have any number of bladders within each series. Although the bladders 54, 56 are only shown in the seat back 26, they may additionally or alternatively be located in the seat base 24.

The fluid system 50 may provide a massage function, for example via bladders 56 positioned within the seating component(s); a lumbar control function with one or more bladders 54 positioned within the seating component(s); or other seat position controls with bladders, such as bladders 54, appropriately positioned in the seating component(s), e.g. to control the angle or tilt of cushion and associated support pan of the seat component relative to its associated frame 22. In other examples, the fluid system 50 may be used for other seat functions and/or features as are known in the art. The fluid system 50 may provide fluid flow to one or more of the bladder assemblies 54 for static inflation where the bladder holds its position at a selected inflation level, e.g. for lumbar or seat position functions, or may provide fluid flow to one or more of the bladder assemblies 56 for dynamic inflation where the bladder inflation or position changes, e.g. for massage functions.

With reference to FIGS. 1-4, the fluid system 50 is provided with a system 60 as described below in greater detail to connect the fluid transfer device 52 to the bladders 54, 56. Generally, a control valve 62 connects the fluid transfer device to either a first rail 64 in fluid communication with the first series of bladders 54, or to a second rail 66 in fluid communication with the second series of bladders 56 depending on the valve 62 position. Valves 68, 70 as described below are provided in each of the first and second rails 64, 66 to control fluid flow to and from the first and second bladders 54, 56, respectively. The valves 68, 70 are stacked or otherwise arranged to be adjacent to one another, and furthermore may be directly coupled to one another. In further examples, additional valves may be stacked onto valves 68, 70, and controlled using the same actuator as described below.

Two actuators 80 are provided for each pair of valves 82, with each pair of valves 82 including one valve 68 and two valves 70. The actuator 80 has an actuator member 84. The actuator 80 may be provided by a solenoid, or other actuator, and in various examples, the actuator member 84 is a rod of a linear actuator, such as in a linear solenoid actuator or a shape-memory alloy (SMA) linear actuator. Each actuator member 84 moves between a first position and a second position, and is coupled to the first and second valves 68, 70 in a pair of valves 82. In various non-limiting examples, the system 60 therefore has at least twice as many valves 68, 70 as actuators 80 and actuator members 84. Each actuator 80 and actuator member 84 is uniquely paired with a valve 68 and one of the valves 70 in an associated pair of valves 82, or pair of ports. As such, the number of actuators 80 in the seat assembly 20 may be reduced, or halved, which allows for installation in a reduced packaging space and reduced cost. As the same actuator is used to control the valves 68, 70 in two separate fluid subsystems, unique challenges arise in controlling the inflation and deflation of bladders in each of these subsystems, as an actuator 80 may open both valves 68, 70 or closes both valves 68, 70 simultaneously.

The systems 50, 60 according to various embodiments are described in further detail below, and may be used to control fluid flow from the fluid transfer device 52 to and from one or more of the bladder assemblies 54, 56 via control of the control valve 62 and the actuators 80.

The actuators 80, the control valve 62, and the fluid transfer device 52 may each be in communication with a controller 90 for control of the operation of the fluid system 50 and valve system 60, and the inflation or deflation of the bladder assemblies 54, 56. The controller 90 may further be in communication with a user input 92 to allow a seat occupant to control operation of the fluid system, or to select various functions, e.g. massage, massage speed, lumbar level, seat position angle, or the like.

Figure 2:
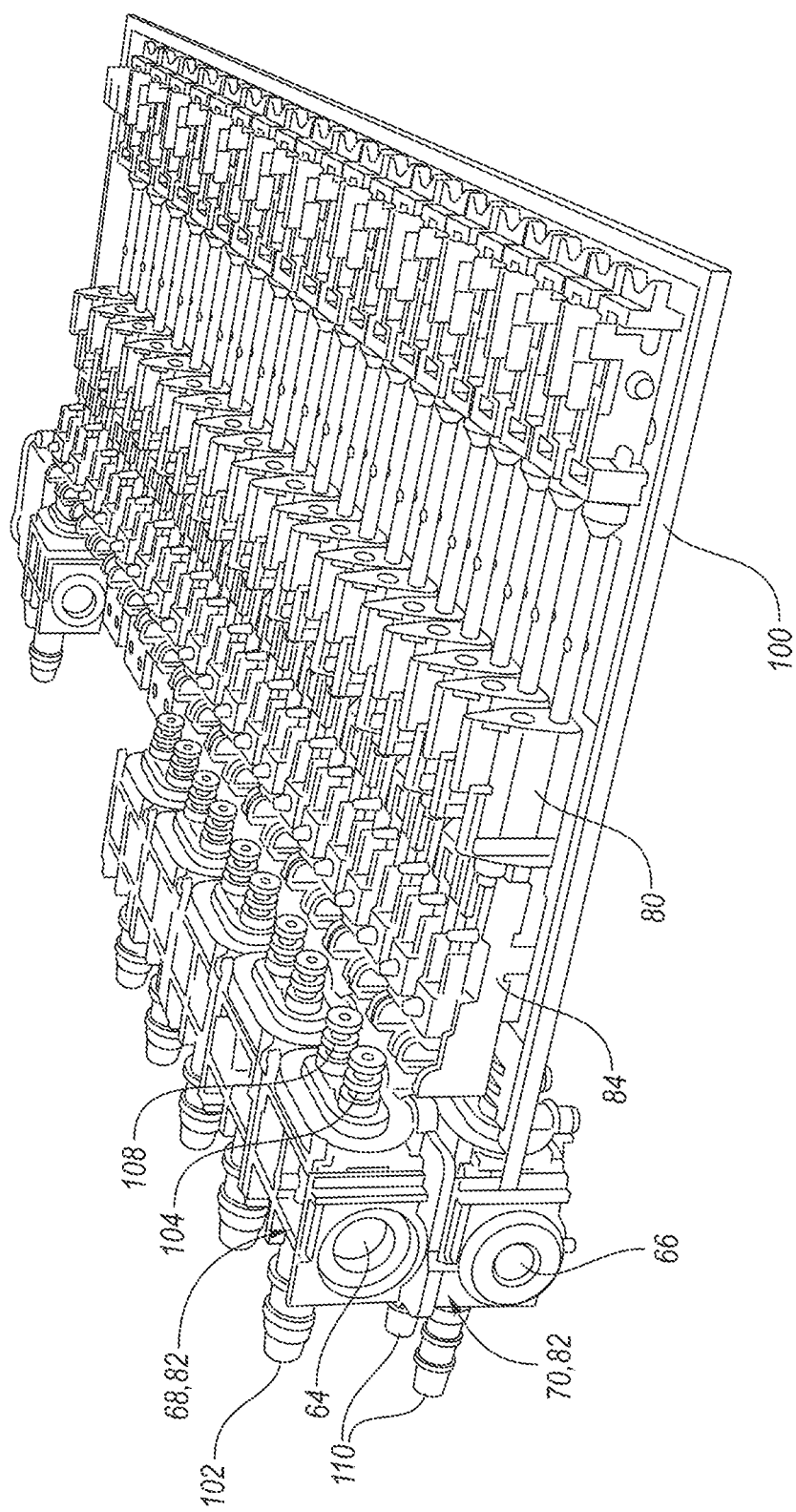
FIG. 2 illustrates a partially assembled valve system according to an embodiment and for use with the seat assembly of FIG. 1.
Figure 3:
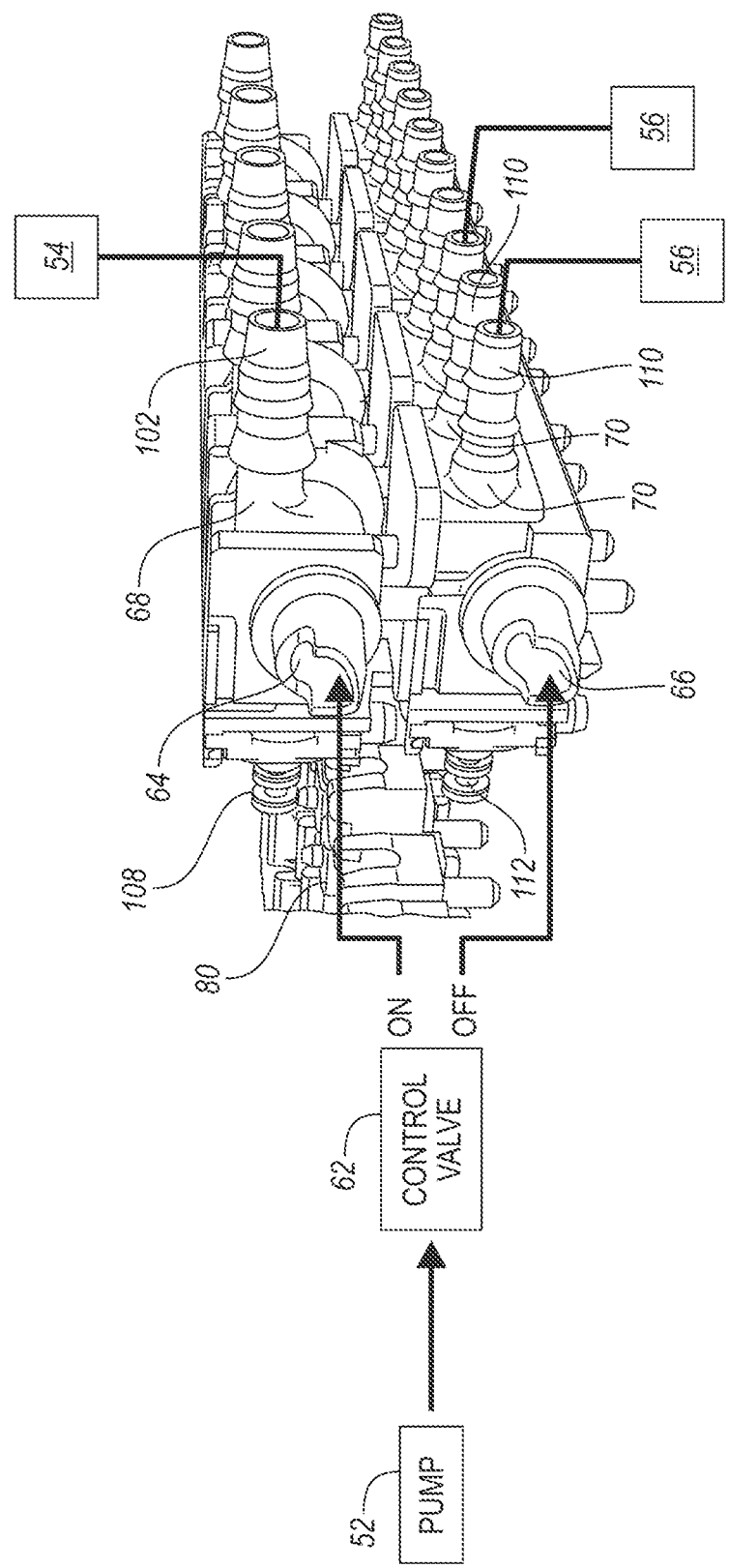
FIG. 3 illustrates a schematic view of the system of FIG. 2 integrated into a fluid system according to an embodiment and for use with the seat assembly of FIG. 1.
Figure 4:
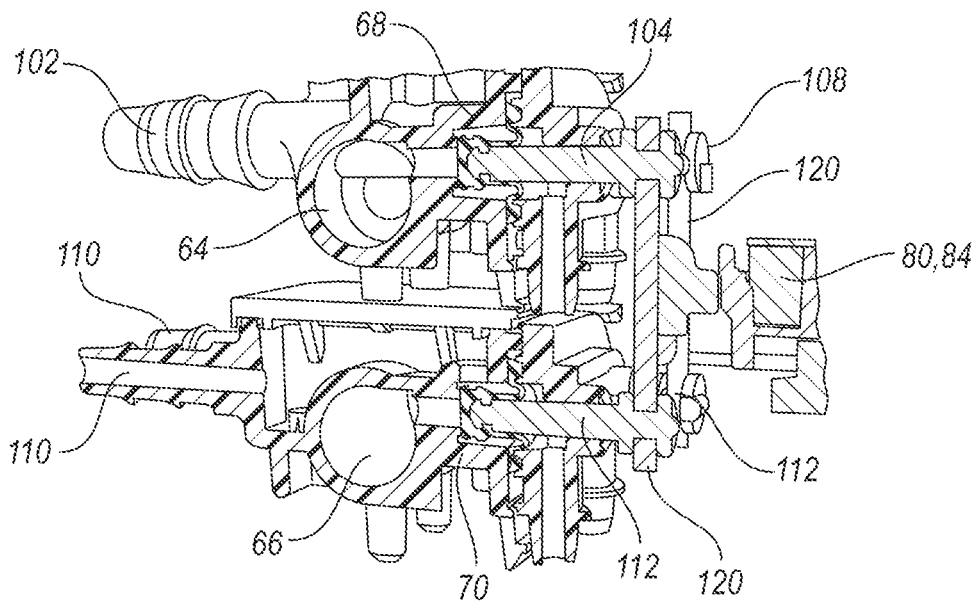
FIG. 4 illustrates a partial sectional view of the system of FIG. 2 illustrating a pair pf valves and an associated actuator.
Figure 5:
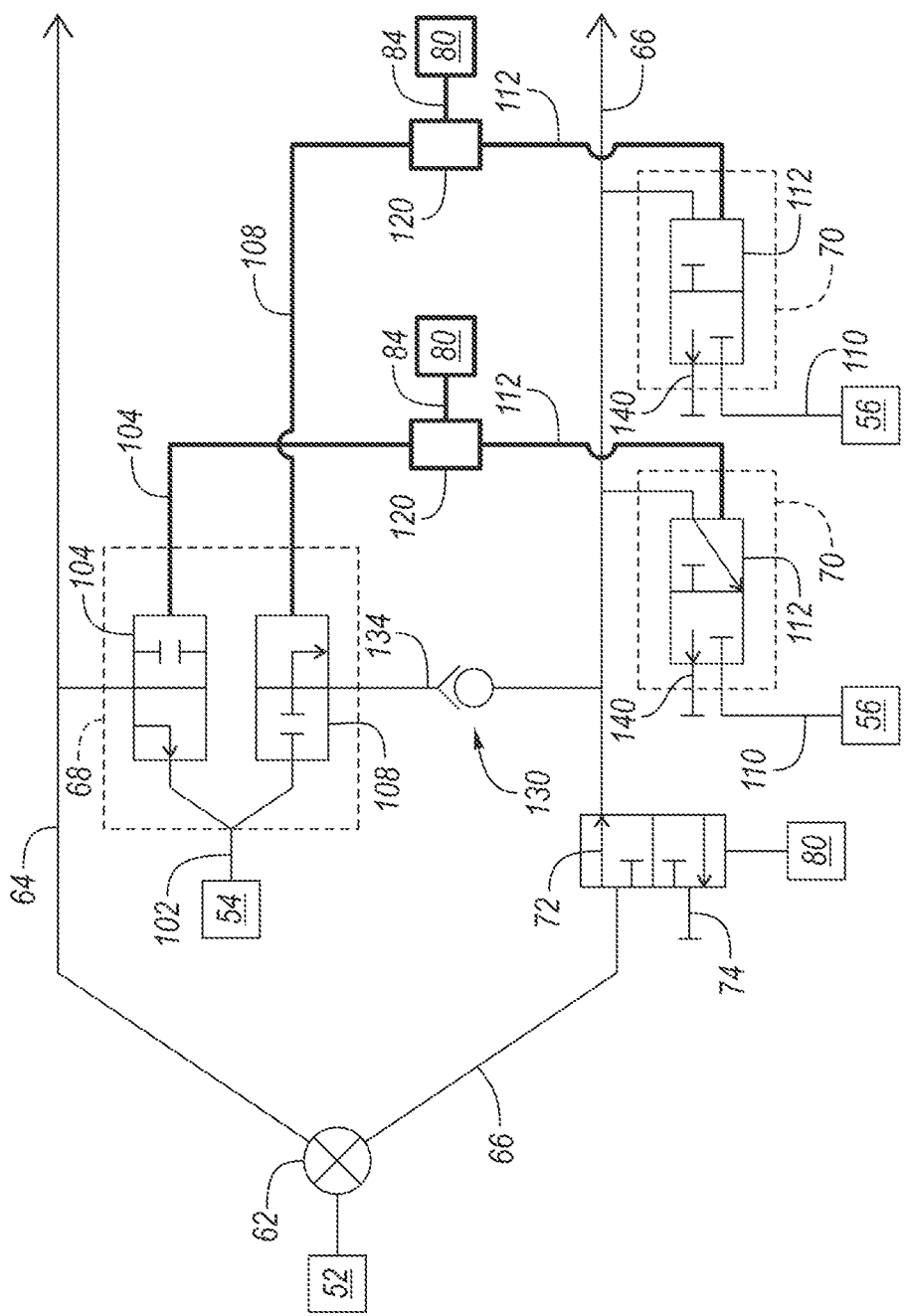
FIG. 5 illustrates a partial schematic view of the valve system of FIG. 2.

FIGS. 2-4 illustrate the valve system 60 and fluid system 50 according to an embodiment. FIG. 5 illustrates a schematic of the valve system 60 with one valve 70 and two valves 68, and two actuators 80, with additional series of valves 70, 68 contemplated with additional bladders 54, 56. In FIG. 2, the system 60 is illustrated as being partially assembled in that not all of the valves 68, 70 have been installed, and the actuators 80 have not been connected to all of the valves, e.g. the connector plate described below is omitted.

A first rail 64 with a first series of valves 68 is provided. A second rail 66 with a second series of valves 70 is provided. There is one valve 68 for every two valves 70, with the valves paired as described above and as shown in FIG. 5. The first rail 64 and first series of valves 68 may be stacked with, and furthermore, may be mounted to the second rail 66 and the second series of valves 70. Furthermore, the first and second rails 64, 66 may be mounted to a substrate 100 as shown.

The first rail 64 is connected to the pump 52 via one or more control valves 62, with a single control valve shown. The control valve 62 may be a two position valve in an example, and controllable between a first position to fluidly connect the pump 52 with only the first rail 64 to provide pressurized fluid flow thereto, and a second position to fluidly connect the pump 52 with only the second rail 66 to provide pressurized fluid flow thereto. The one or more control valves 62 therefore control fluid flow from the pump 52 to either the first rail 64 or the second rail 66. In other examples, there may be two pumps connected to and providing fluid flow to each of the associated rails 64, 66 separately. An additional vent valve 72 may be provided in the second rail 66 as shown to selectively fluidly couple the rail 66 to atmosphere in order to vent or depressurize the rail 66 by connecting the second rail 66 to a vent line 74. An actuator 80 may be provided to control the vent valve 74 position, or the vent valve 74 may be otherwise controlled, e.g. pneumatically. The valve 72 may be provided similarly to that described for valve 70 in various non-limiting examples.

The series of first valves 68 is connected to a series of first bladders 54, such as lumbar bladders. Each first valve 68 has a first port 102 with an associated first valve element 104 and an associated second valve element 108. The first and second valve elements 104, 108 may each be provided with a valve stem and valve end that cooperates with the valve body to control fluid flow through the first valve 68 and through the first port 102. Each first valve 68 connects to a first bladder 54, with the first port 102 fluidly coupled to the same first bladder 54. The first bladder 54 may be provided as static bladder, e.g. as a lumbar bladder, a bladder for controlling a seat position, or the like.

The first port 102 of each of the first valves 68 receives pressurized fluid from the first rail 64 to inflate the bladder 54, and the first valve element 104 controls fluid flow between the first rail 64 and the first port 102, e.g. fluid flows from the first rail 64 and into the first port 102 to fill the bladder 54 when the first valve element 104 is in one position, or open position, and fluid is prevented from flowing from the first rail 64 into the first port 102 when the second valve element 108 is in the other position. The first port 102 of each of the first valves 68 receives fluid flow from the associated bladder 54 to deflate the bladder, with the first port 102 fluidly connecting the first bladder 54 to a vent line 134 or to atmosphere, as described below. The second valve element 108 controls fluid flow between the first port 102 and atmosphere, e.g. fluid flows out of the first bladder 54 through the first port 102 when the second valve element 108 is in one, open position, and fluid is prevented from flowing out of the first bladder 54 and through the first port 102 when the second valve element 108 is in the other, closed position, e.g. to maintain inflation of the bladder 54. The first valve element 104 therefore controls fluid flow between the first rail 64 and the first port 102, and the second valve element 108 controls fluid flow between the first port 102 and atmosphere, e.g. via a vent line 134 in the valve 68. Two valve elements 104, 108 are therefore provided for each first valve 68 to separately control flow to the associated bladder 54 and from the associated bladder 54.

The series of second valves 70 is connected to a series of second bladders 56, such as massage bladders. As shown, there may be two second valves 70 associated with each first valve 68. Each second valve 70 has a second port 110 with an associated third valve element 112. The third valve element 112 may be provided as a valve stem and valve end that cooperates with the valve body of the second valve 70 to control fluid flow through the second valve 70, and into or out of the associated second bladder 56. Each second valve 70 connects to a respective second bladder 56, with the second port 110 fluidly connected to the second bladder 56. In other examples, multiple bladders may be connected to the second port 110, e.g. in a serial and/or parallel flow arrangement. The second bladder 56 may be provided as dynamic bladder, e.g. as a massage bladder, or the like. The second port 110 of each of the second valves 70 receives pressurized fluid from the second rail 66 to inflate the bladder 56, and also receives fluid flow from the associated bladder 56 to deflate the bladder 56.

Each third valve element 112 controls fluid flow between the second rail 66 and the second port 110, and also between the second port 110 and atmosphere via a vent port 140 in the second valve 70. For example, the third valve element 112 may be in a first, open position to allow fluid flow from the second rail 66 and into the second port 110 to inflate the second bladder 56, and the valve element 112 blocks the port 110 from the valve vent 140 such that venting the second bladder 56 is blocked. When the valve element 112 is in a second, closed position, the port 110 is in fluid communication with vent port 140 or line that may be provided within the valve 70 body, and fluid flows from the second bladder 56 and to atmosphere, to deflate the second bladder 56, and the valve element 112 blocks inflation of the second bladder 56 as the third valve element 112 prevents flow between the second rail 66 and the second port 110. Therefore, the third valve element 112 of the second valve 70 moves between a first, open position to allow fluid flow from the second rail 66 into the port 110 and associated bladder 56, and a second, closed position to allow fluid flow from the bladder 56 and port 110 to vent to atmosphere, e.g., via a vent line 140 in the valve 70 body.

A series of pairs of actuators 80 are also provided. The actuator 80 has an actuator member 84, and may be a linearly actuated solenoid or an SMA actuator as described above in various examples. Each actuator member 84 is movable between a first actuator position and a second actuator position. In the example shown, the actuator member 84 moves linearly towards and away from the valves 68, 70.

One actuator 80 in each pair of actuators has its actuator member 84 coupled to both a first valve element 104 of a first valve 68, and a third valve element 112 of a second valve 70 for movement therewith. Another actuator 80 in each pair of actuators has its actuator member 84 coupled to both a second valve element 108 in the first valve 68, and a third valve element 112 of another, adjacent second valve 70 for movement therewith, with the another adjacent second valve 70 fluidly coupled to another second bladder 56 in the series of second bladders.

The actuator member 84 of each actuator 80 is therefore directly coupled to two valve elements of two different valves 68, 70 and associated bladders such that the two valve elements move directly with the associated actuator member. A connector plate 120 or other connector element may be used to connect the actuator member to the two valve elements, and the connector plate 120 may include keys or slots to engage the valve elements or stems, and the coupling plate pushes or pulls the valve elements as the actuator member is moved by the actuator. As shown in FIG. 4, one connector plate 120 for one actuator 80 is coupled to only valve element 104 and the near valve element 112, and another connector plate 120 for another actuator 80 is coupled to only valve element 108 and the far valve element 112.

In other examples, two series of first valves and first bladders may be provided for use in the system 60, or two series of second valves and second bladders may be provided for use in the system 60.

When one, first actuator 80 in the pair of actuators is in a first position with associated valve elements 104, 112 in open positions, the first port 102 of the first valve 68 and the second port 110 of one of the second valves 70 is therefore open and in fluid communication with their associated first and second rail 64, 66. The first or second rail 64, 66 is selectively pressurized via the control valve 62 to control which bladders 54, 56, are inflated. When the first actuator is in a second position, with associated valve elements 104, 112 in closed positions, the first port 102 of the first valve 68 is fluidly decoupled from the first rail 64, and the third port 110 of the one of the second valves 70 also closed (e.g. permitting venting to atmosphere via vent 140 in the valve body 70).

When the other, second actuator in the pair of actuators is in a second position with associated valve elements 108, 112 in closed positions, the first port 102 of the first valve 68 is closed to prevent fluid flow from the port 102 to the valve vent line 134 and maintain inflation of the first bladder 54, and the third port 110 of the other of the second valves 70 is in fluid communication with the vent line 134 of the valve 70 to deflate the other second bladder 56. When the second actuator is in a first open position, with associated valve elements 108, 112 in open positions, the first port 102 of the first valve 68 is in fluid communication with the valve vent line 134 to vent to atmosphere, and the third port 110 of the other of the second valves 70 also open to fluidly connect the second rail 66 to the port 110 (e.g. permitting inflation when the second rail 66 is pressurized).

Therefore the control valve 62 is used in conjunction with the actuators 80 to control the fluid flow pathway and control whether the first or second bladder 54, 56 is inflated, and how the first and second bladders 54, 56 are deflated. Using the system 50 as described, the first bladder(s) 54 and the second bladder(s) 56 may not be able to be inflated at the same time, as only one of the two rails 64, 66 is pressurized.

In order to inflate one or more first bladders 54 in the series of first bladders, the control valve 62 is controlled to a first valve position such that fluid flows from the pump 52, and to the first rail 64, and does not flow to the second rail 66. The actuators 80 are controlled to the positions based on the selected first bladders 54 for inflation. For a first bladder 54 that is selected to be inflated, one associated actuator 80 is controlled to move valve element 104 to the open position to open the first port 102 of the first associated valve 68, such that fluid flows from the first rail 64, through the port 102, and into the first bladder 54 (note that this likewise opens the valve element 112 for the paired valve 70, however, the bladder 56 does not inflate as the second rail 66 is not pressurized). The other associated actuator 80 for the first bladder 54 is controlled to move the valve element 108 to a closed position to fluidly disconnect the first port 102 of the first associated valve from the valve vent line 134, such that fluid cannot flow from the first bladder 54 and vent to atmosphere and the inflation is maintained (note that this likewise closes the valve element 112 for the paired valve 70, which places the bladder 56 in fluid communication with atmosphere via the vent 134 in the valve 68, which deflates the bladder 56 to the extent that there is any air present in it).

In order to inflate one or more second bladders 56 in the series of second bladders, the control valve 62 is controlled to a second valve position such that fluid flows from the pump 52, and to the second rail 66, and does not flow to the first rail 64. The actuator 80 associated with each second bladder 56 are controlled between their two positions in a controlled manner to inflate and deflate the second bladder 56, e.g. to provide a dynamic inflation and deflation, or massage effect, by selectively fluidly coupling the second port 110 of the second valve with the pressurized second rail 66 or with atmosphere, e.g. with a vent port 140 within the valve 70. For a second bladder 56 that selected to be inflated, the associated actuator 80 is controlled to move the valve element 112 to an open position to open the second port 110 of the associated second valve, such that fluid flows from the second rail 66 and into the second bladder 56. For a second bladder 56 that selected to be deflated, the associated actuator 80 is controlled to move to the other position to move the valve element 112 to a closed position to close off the second port 110 of the associated second valve from the second rail 66, and open a pathway between the second port 110 and atmosphere such that fluid flows from the second bladder 56, through the third port 110 and valve 70, and to atmosphere. Note that valve elements 104, 108 may be moved depending on which valve element 104, 108 of the first valve 68 is paired with the valve element 112 via connector plate 120.

In order to deflate the series of first bladders 54, the actuator 80 associated with the second valve element 108 of the first valve 68 is moved to a position to open the first port 102 and allow fluid flow to exit the first bladder 54 via the first port 102, with the first valve element 104 in a closed position to disconnect the port 102 from the first rail 64. In this configuration, The first port 102 vents to atmosphere, examples of which are provided schematically in FIGS. 5-8. The second valve element 108 may be moved to deflate the associated bladder 54 with the first actuator 104 closed and the first rail 64 pressurized, or with the first rail 64 unpressurized.

In one example, and for deflation of the series of first bladders 54, the system 50 has a check or relief valve 130 associated with each first valve 68 to fluidly connect the vent line 134 of the valve 68 to the second rail 66 and second valve(s) 70, either directly from the first valve 68 or from a vent rail to the second rail 66. In one example, the check valve 130 is a passive valve, with the check valve 130 opening when the pressure in the second rail 66 is lower than the pressure in the vent line 134, and closing when the pressure in the second rail 66 is greater than the pressure in the vent line 134. The first port 102 of the first valve is placed in fluid communication with the vent line 134 with the valve element 108 in an open position such that is receives pressurized fluid from the first bladder 54 and fluid flows to the vent line 134 of the valve 68. The vent valve 72 may also be controlled to a position to fluidly connect the second rail 66 to atmosphere. Therefore, the first bladder 54 vents through the first port 102 of the first valve with the valve element 108 in an open position, through the vent line 134 and check valve 130, to the second rail 66, and then to atmosphere via the vent port 74 in the vent valve 72.

When the first rail 64 is pressurized for selective inflation of the first bladders 54, the vent valve 72 may be controlled to a vent position such that the second rail 66 is unpressurized and in fluid communication with atmosphere via the vent line 74, which also allows for selective deflation of the first bladders 54. When the second rail 66 is pressurized for selective inflation of the second bladders 56, the vent valve 72 may be controlled to a closed position such that the second rail 66 is pressurized and the vent line 74 is decoupled from the second rail 66, which also allows for selective inflation and deflation of the first bladders 54 via their respective valves 70. When the system 50, 60 is inoperative, the valve 72 may be in a vent position to allow for selected deflation of the first bladders 54 to the extent that any are inflated.

In another example, and for deflation of the series of first bladders 54, the system 50 has a third vent rail 136 fluidly coupled to each of the vent lines 134 of the first valves to receive fluid flow therefrom depending on the position of the second valve element 108. The third vent rail would be positioned between vents 134 for each of the valves 68 in the system 60 and a single, common check valve 130 in FIG. 5, with the check valve 130 connecting the third rail 136 to the second rail 66. The third rail 136 therefore provides a common vent rail for all of the first bladders 54. The third vent rail 136 is fluidly coupled to the second rail 66 and second valves 70 via a check valve 130 or relief valve. In one example, the check valve 130 is a passive valve, with the check valve 130 opening when the pressure in the second rail 66 is lower than the pressure in the third rail 136, and closing when the pressure in the second rail 66 is greater than the pressure in the third rail 136. The first port 102 is fluidly connected to the vent line 134 of the first valve 68 by opening valve element 108 such that is receives pressurized fluid from the first bladder 54. The vent valve 72 may also be controlled to a position to fluidly connect the second rail 66 to atmosphere. Therefore, the first bladder 54 vents through the first port 102 of the first valve with the valve element 108 in an open position, through the vent line 134 and common vent rail (along with fluid flow from any other deflating first bladders 54), through check valve 130, to the second rail 66, and then to atmosphere via the vent port 74 in the vent valve 72. Therefore, the first bladder 54 vents through the first port 102 of the first valve 68, past the valve element 108 and through the vent line 134 to the third rail 136, through the check valve 130, to the second rail 66, and then to atmosphere via the vent 74 in the vent valve 72.

In other examples, the vent line 134 of the first valve 68 may be directly connected to atmosphere, e.g. such that the check valve 130 and fluid connection to the second rail 66 and the vent valve 72 are not present.

By venting the first bladders 54 into the second rail 66, the time to pressurize the second rail 66 may be reduced, leading to a reduced lag time for inflation of the second bladders 56 after a request for operation. The first bladders 54 may also maintain inflation or have reduced deflation as the pressure in the second rail 66 limits opening of the check valve(s) 130 to vent the bladder 54. For individual check valves 130 for each bladder 54, cross-flow that may be otherwise permitted by the vent rail 136 is prevented.

In either instance, when the second rail 66 is pressurized, e.g. to inflate the second bladder(s) 56, then the check valve 130 is closed, and vent line 134 or the third rail 136 remains pressurized such that fluid flow does not flow from the port 102 with the valve element 108 in an open position, and the first bladder 54 may not rapidly deflate.

Figure 6:
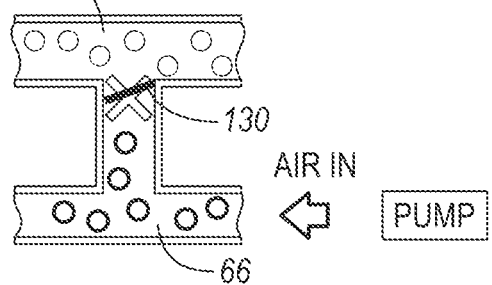
FIG. 6 illustrates a schematic view of a check valve in the system of FIGS. 2 and 5 in a first configuration.
Figure 7:
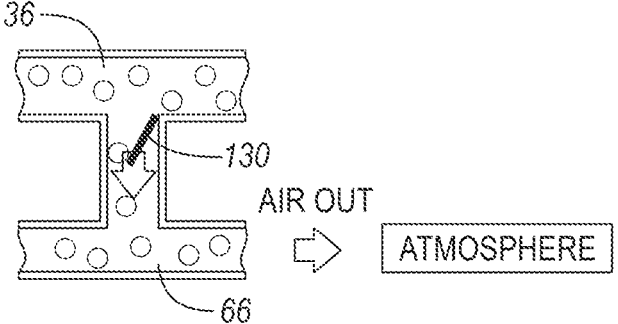
FIG. 7 illustrates a schematic view of a check valve in the system of FIGS. 2 and 5 in a second configuration.
Figure 8:
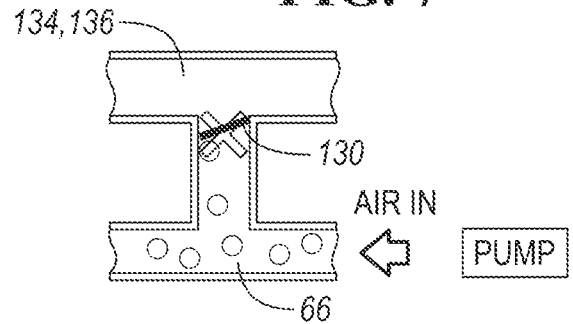
FIG. 8 illustrates a schematic view of a check valve in the system of FIGS. 2 and 5 in a third configuration.

FIGS. 6-8 illustrate schematic views of a check valve 130 connecting the two fluid sub-systems of the fluid system 50. In FIGS. 6-8, the vent line 134 of the first valve 68 (or the third vent rail 136 if one is optionally provided) is connected to the second rail 66 via the check valve 130 or relief valve.

In FIG. 5, the check valve 130 is closed as the pressure in the second rail 66 is greater than the pressure in the vent line 134, for example, when the pump 52 is operating and the control valve 62 fluidly couples the pump 52 to the second rail 66 in order to inflate the second bladder(s) 56. As the check valve 130 is closed, the first bladder(s) 54 do not vent to atmosphere and maintain their inflation, even when the actuator 80 connected to the second valve element 108 and the other third valve element 112 is moved to inflate the second bladder 56 associated with the other third valve element, which causes the valve element 108 to open and fluidly connect the first port 102 of the first valve 68 with the vent line 134.

In FIG. 6, the check valve 130 is opened as the pressure in the vent line 134 is greater than the pressure in the second rail 66, for example, when the pump 52 is operating and the control valve 62 fluidly couples the pump 52 to the first rail 64 in order to inflate the first bladder(s) 54, or when the pump 52 is off, such that the second rail 66 is not pressurized by the pump 52 via valve 62. As the pump 52 is not providing pressurized fluid to the second rail 66, the pressure in the vent line 134 is greater than the pressure in the second rail 66, and the check valve 130 opens to allow the first bladder 54 to deflate. The actuator 80 associated with the second valve element 108 and the other third valve element 112 is moved to allow the first bladder 54 to deflate, which fluid flow from the vent line 134, through the valve 130, into the second rail 66, and then to atmosphere via a vent passage 74 in a vent valve 72.

In FIG. 7, the pump 52 is operating and the control valve 62 is controlled to provide pressurized fluid to the second rail 66; however, the actuator 80 associated with the vent valve 72 has not been actuated to connect the second rail 66 to atmosphere via the vent line 74. As such, the pressure in the second rail 66 is greater than the pressure in the vent line 134, and the check valve 130 is closed.

In order to provide for deflation of one or more of the first bladder(s) 54 when the second rail 66 is pressurized and the second bladder(s) 56 are being inflated, either (i) the actuators 80 may be controlled to open the valve element(s) 108 and deflate the first bladders 54 prior to pressurizing the second rail 66, or (ii) the first bladders 54 may be deflated over time based on fluid flow through the check valve 130 and the pressure differential across the check valve 130.

Generally, the disclosure invention relates to a valve system 60 for use with two separate fluid or air sub-systems in a fluid system 50 in a seat such as a vehicle seat assembly 20, and these systems may include massage and lumbar systems. A series of first valves 68 are connected to the first bladders 54 and a series of second valves 70 are connected to the second bladders 56. The first and second valves 68, 70 may be stacked. A series of actuators 80 are used to control the valve 68, 70 positions, with each actuator 80 connected to two different valves 68, 70. For example, a single actuator 80 is connected to both a first valve 68 in a first rail 64, and a second valve 70 in a second rail 66 to control air flow to air bladders 54, 56 connected to those respective rails. A control valve 62 upstream of the rails is used to control or switch air flow between one of the two rails. A relief or check valve 130 may be provided between the two rails or between first and second valves to vent one rail into the other, for example, to allow for deflating the lumbar bladders while operating massage with the second rail pressurized. An additional vent valve may be provided to selectively vent the second rail to atmosphere, for example, when venting the first bladders 54. The number of actuators is therefore reduced providing for reduced package size and cost.

Aspect 1. A system is provided with a first valve having a first valve element, and a second valve having a second valve element, with the second valve positioned adjacent to the first valve. A first actuator is provided with an actuator member movable between a first actuator position and a second actuator position, and the actuator member is coupled to each of the first valve element and the second valve element for movement therewith.

Aspect 2. The system of any of aspects 1 or 4-16 wherein each of the first and second valves are in a closed position when the actuator member is in the first actuator position and in an open position when the actuator member is in the second actuator position.

Aspect 3. The system of aspect 2 further comprising a third valve with a third valve element, wherein the first valve has a fourth valve element.

Aspect 4. The system of aspect 3 wherein the system further comprises a second actuator with a second actuator member coupled to each the third and fourth valve elements for movement therewith.

Aspect 5. The system of any one of aspects 1-4 or 6-16 wherein the first actuator is a solenoid actuator or a shape-memory alloy actuator.

Aspect 6. The system of any one of aspects 1-5 or 7-16 further comprising a connector plate connected to the actuator member, and the first and second valve elements.

Aspect 7. The system of any one of aspects 1-6 further comprising a pump positioned upstream of the first and second valves, and a control valve fluidly connecting the pump to the first and second valves. The pump is fluidly coupled to the first valve with the control valve in a first valve position, and the pump is fluidly coupled to the second valve with the control valve in a second valve position.

Aspect 8. The system of aspect 7 further comprising a first fluid rail providing pressurized fluid from the pump to the first valve via the control valve, and a second fluid rail providing pressurized fluid from the pump to the second valve via the control valve.

Aspect 9. The system of aspect 8 further comprising a first bladder in fluid communication with the first valve to receive pressurized fluid therefrom.

Aspect 10. The system of aspect 9 wherein the first valve has a first port in fluid communication with the first bladder, wherein the first port fluidly couples the first fluid rail to the first bladder via the first valve element, and wherein the first port fluidly couples the first bladder to atmosphere via a third valve element of the first valve.

Aspect 11. The system of aspect 10 further comprising a second bladder in fluid communication with a second port of the second valve to receive pressurized fluid therefrom.

Aspect 12. The system of any one of aspects 11 or 13-14 further comprising a third valve with a fourth valve element, wherein the third valve is in fluid communication with the second fluid rail. A second actuator with a second actuator member coupled to each the third and fourth valve elements for movement therewith. A third bladder is in fluid communication with the third valve to receive pressurized fluid therefrom.

Aspect 13. The system of any one of aspects 11-12 wherein the second fluid rail is in fluid communication with atmosphere with the second valve element in a closed position, and wherein the second fluid rail is in fluid communication with the second port and the second bladder with the second valve element in an open position.

Aspect 14. The system of claim 13 further comprising a vent valve fluidly connecting the second rail to atmosphere in a vent position.

Aspect 15. The system of aspect 14 further comprising a check valve fluidly connecting the first port of the first valve to the second fluid rail via the third valve element, wherein the check valve is positioned to be closed when a pressure in the second fluid rail is greater than a pressure in the first port with the third valve element in an open position.

Aspect 16. The system of aspect 14 further comprising a third fluid rail receiving fluid from the first port of the first valve, and a check valve fluidly connecting the third fluid rail to the second fluid rail. The check valve is positioned to be closed when a pressure in the second fluid rail is greater than a pressure in the third fluid rail.

Aspect 17. A system is provided with a pump, a first rail connected to the pump via at one or more control valves, and a second rail connected to the pump via the one or more control valves. The one or more control valves control fluid flow from the pump to one of the first rail and the second rail. A series of first valves is provided, with each first valve having a first port with an associated first valve element and an associated second valve element, and a vent line. The first port of each of the first valves receives pressurized fluid from the first rail via the first valve element. A series of first bladders is provided, with each first bladder fluidly coupled to the port of one of the first valves. A series of pairs of second valves is provided, with each second valve having a second port with an associated third valve element, and the second port of each of the second valves receiving pressurized fluid from the second rail. A series of second bladders is provided, with each second bladder fluidly coupled to the second port of one of the second valves. A series of pairs of actuators is provided, with one of the actuators in each pair of actuators coupled to the first valve element and third valve element of one of the second valves in each pair for movement therewith, and the other of the actuators in each pair of actuators coupled to the second valve element and third valve element of the other of the second valves in each pair for movement therewith.

Aspect 18. The system of aspect 17 further comprising one or more check valves fluidly coupling the vent line of the at least one of the first ports to the second rail, wherein the one or more check valves are positioned to be closed when a pressure in the second rail is greater than a pressure in the at least one of the first ports with the second valve element in an open position.

Aspect 19. A method is provided. Fluid flow is pumped to a first rail via a control valve in a first position. Fluid flow is pumped to a second rail via the control valve in a second position. A first actuator is actuated to a first position thereby moving a first valve element in a first valve and a second valve element in a second valve to open positions with the control valve in the first position thereby inflating a first bladder connected to the first valve while maintaining deflation of a second bladder connected to the second valve. The first actuator is actuated to the first position thereby moving the first valve element and the second valve element to open positions with the control valve in the second position thereby inflating the second bladder connected to the second valve without changing a state of inflation of the first bladder. A second actuator is actuated to a first position thereby moving a third valve element in the first valve and a fourth valve element in a third valve to open positions with the control valve in the first position thereby deflating a first bladder connected to the first valve while maintaining deflation of a third bladder connected to the third valve.

Aspect 20. The method of aspect 19 further comprising opening a vent valve to a vent position thereby fluidly coupling the second rail to atmosphere, and opening a check valve in response to a pressure in the second rail being less than a pressure in the first valve thereby deflating of the first bladder with the second actuator in the first position.

While exemplary embodiments are described above, it is not intended that these embodiments describe all possible forms according to the disclosure. In that regard, the words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:
1. A system comprising:
a first valve having a first valve element;
a second valve having a second valve element, the second valve positioned adjacent to the first valve;
a first actuator with an actuator member moveable between a first actuator position and a second actuator position, the actuator member coupled to each of the first valve element and the second valve element for movement therewith;
a pump positioned upstream of the first and second valves;
a control valve fluidly connecting the pump to the first and second valves; and
wherein the pump is fluidly coupled to the first valve with the control valve in a first valve position, and wherein the pump is fluidly coupled to the second valve with the control valve in a second position.

2. The system of claim 1 wherein each of the first and second valves are in a closed position when the actuator member is in the first actuator position and in an open position when the actuator member is in the second actuator position.

3. The system of claim 2 further comprising a third valve with a third valve element;
wherein the first valve has a fourth valve element.

4. The system of claim 1 wherein the first actuator is a solenoid actuator or a shape-memory alloy actuator.

5. The system of claim 1 further comprising a connector plate connected to the actuator member, and the first and second valve elements.

6. The system of claim 1 further comprising a first fluid rail providing pressurized fluid from the pump to the first valve via the control valve, and a second fluid rail providing pressurized fluid from the pump to the second valve via the control valve.

7. The system of claim 6 further comprising a first bladder in fluid communication with the first valve to received pressurized fluid therein.

8. The system of claim 7 wherein the first valve has a first port in fluid communication with the first bladder, wherein the first port fluidly couples the first fluid rail to the first bladder via the first valve element, and wherein the first port fluidly couples the first bladder to atmosphere via a third valve element of the first valve.

9. The system of claim 8 further comprising a second bladder in fluid communication with a second port of the second valve to receive pressurized fluid therefrom.

10. The system of claim 9 further comprising a third valve with a fourth valve element, wherein the third valve is in fluid communication with the second fluid rail;
   a second actuator with a second actuator member coupled to each of the third and fourth valve elements for movement therewith; and
   a third bladder in fluid communication with the third valve to receive pressurized fluid therefrom.

11. The system of claim 9 wherein the second fluid rail is in fluid communication with atmosphere with the second valve element in a closed position, and wherein the second fluid rail is in fluid communication with the second port and the second bladder with the second valve element in an open position.

12. The system of claim 11 further comprising a vent valve fluidly connecting the second fluid rail to atmosphere in a vent position.

13. The system of claim 12 further comprising a check valve fluidly connecting the first port of the first valve to the second fluid rail via the third valve element, wherein the check valve is positioned to be closed when a pressure in the second fluid rail is greater than a pressure in first port with the third valve element in an open position.

14. The system of claim 12 further comprising a third fluid rail receiving fluid from the first port of the first valve; and
   a check valve fluidly connecting the third fluid rail to the second fluid rail, wherein the check valve is positioned to be closed when a pressure in the second fluid rail is greater than a pressure in the third fluid rail.

15. A system comprising:
   a first valve having a first valve element;
      a second valve having a second valve element, the second valve positioned adjacent to the first valve;
      a first actuator with an actuator member moveable between a first actuator position and a second actuator position, the actuator member coupled to each of the first valve element and the second valve element for movement therewith, and wherein each of the first and second valves are in a closed position when the actuator member is in the first actuator position and in an open position when the actuator member is in the second actuator position;
      a third valve with a third valve element;
      wherein the first valve has a fourth valve element; and
      a second actuator with a second actuator member coupled to each of the third and fourth valve elements for movement within.

16. A system comprising:
   a pump;
   a first rail connected to the pump via one or more control valves;
   a second rail connected to the pump via the one or more control valves, wherein the one or more control valves control fluid from the pump to one of the first rail and the second rail;
   a series of first valves, each first valve having a first port with an associated first valve element and an associated second valve element, and a vent line, the first port of each of the first valves receiving pressurized fluid from the first rail via the first valve element;
   a series of first bladders, each first bladder fluidly coupled to the first port of one of the first valves;
   a series of pairs of second valves, each second valve having a second port with an associated third valve element, the second port of each of the second valves receiving pressurized fluid from the second rail;
   a series of second bladders, each second bladder fluidly coupled to the second port of one of the second valves; and
   a series of pairs of actuators, one of the actuators in each pair of actuators coupled to the first valve element and third valve element of one of the second valves in each pair for movement therewith, and the other of the actuators in each pair of actuators coupled to the second valve element and third valve element of the other of the second valves in each pair for movement therewith.

17. The system of claim 16 further comprising one or more check valves fluidly coupling the vent line of the at least one of the first ports to the second rail, wherein the one or more check valves are positioned to be closed when a pressure in the second rail is greater than a pressure in the last one of the first ports with the second valve element in an open position.

18. A method comprising:
   pumping fluid flow to a first rail via a control valve in a first position;
   pumping fluid flow to a second rail via the control valve in a second position;
   actuating a first actuator to a first position thereby moving a first valve element in a first valve and a second valve element in a second valve to open positions with the control valve in the first position thereby inflating a first bladder connected to the first valve while maintaining deflation of a second bladder connected to the second valve;
   actuating the first actuator to the first position thereby moving the first valve element and the second valve element to open positions with the control valve in the second position thereby inflating the second bladder connected to the second valve without changing a state of inflation of the first bladder; and
   actuating a second actuator to a first position thereby moving a third valve element in the first valve and a fourth valve element in a third valve to open positions with the control valve in the first position thereby deflating a first bladder connected to the first valve while maintaining deflation of a bladder connected to the third valve.

19. The method of claim 18 further comprising opening a vent valve to a vent position thereby fluidly coupling the second rail to atmosphere; and
   opening a check valve in response to a pressure in the second rail being less than a pressure in the first valve thereby deflating the first bladder with the second actuator in the first position.

\* \* \* \* \*